United States Patent
Asefi et al.

(10) Patent No.: US 12,271,291 B1
(45) Date of Patent: Apr. 8, 2025

(54) TEST COVERAGE FOR WORKFLOWS

(71) Applicant: Wells Fargo Bank, N.A., San Francisco, CA (US)

(72) Inventors: Azita Asefi, Vacaville, CA (US); David A. Friedlander, Petaluma, CA (US); Timothy O'Donoghue, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 273 days.

(21) Appl. No.: 18/061,153

(22) Filed: Dec. 2, 2022

(51) Int. Cl.
*G06F 11/36* (2025.01)
*G06F 11/3668* (2025.01)

(52) U.S. Cl.
CPC ...... *G06F 11/3676* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 7,739,325 B1* | 6/2010 | Okita | ...................... | G06Q 10/06 709/200 |
| 7,840,857 B2* | 11/2010 | Breiter | ...................... | G06F 11/28 714/48 |
| 8,527,327 B1* | 9/2013 | Lawrence | ............ | G06Q 10/103 705/7.41 |
| 9,946,983 B1* | 4/2018 | Shashi | ............. | G06Q 10/06316 |
| 9,990,274 B2 | 6/2018 | Shufer et al. | | |
| 10,114,737 B2 | 10/2018 | Ramakrishna et al. | | |
| 10,282,281 B2 | 5/2019 | Mallya | | |
| 10,394,532 B2 | 8/2019 | Bar-Or et al. | | |

(Continued)

FOREIGN PATENT DOCUMENTS

| | | | |
|---|---|---|---|
| CN | 114490379 A | * | 5/2022 |
| CN | 114647495 A | * | 6/2022 |

(Continued)

OTHER PUBLICATIONS

Faezeh Khorram, Jean-Marie Mottu, Gerson Sunye, Challenges & opportunities in low-code testing, MODELS '20: Proceedings of the 23rd ACM/IEEE International Conference on Model Driven Engineering Languages and Systems: Companion Proceedings, Article No. 70, Oct. 2020.

(Continued)

*Primary Examiner* — Philip Wang
*Assistant Examiner* — Rongfa P Wang
(74) *Attorney, Agent, or Firm* — Merchant & Gould P.C.

(57) ABSTRACT

An example computer system for managing test coverage for a workflow can include: one or more processors; and non-transitory computer-readable storage media encoding instructions which, when executed by the one or more processors, causes the computer system to create: a workflow execution engine programmed to execute the workflow, including a plurality activities, using a test case; an activity identification engine programmed to identify each time one of the plurality of activities is invoked by the workflow using the test case; and a test coverage engine programmed to determine the test coverage for the workflow based upon identification by the activity identification engine of the plurality of activities invoked by the workflow.

10 Claims, 4 Drawing Sheets

(56) References Cited

U.S. PATENT DOCUMENTS

| | | | |
|---|---|---|---|
| 10,896,035 B1 | 1/2021 | Abdulhayoglu | |
| 11,100,075 B2 | 8/2021 | Maloy et al. | |
| 11,163,544 B2 | 11/2021 | Lee | |
| 11,240,344 B2 | 2/2022 | Swope et al. | |
| 11,275,754 B2 | 3/2022 | Wilson et al. | |
| 11,334,472 B2 | 5/2022 | Elges et al. | |
| 11,593,740 B1* | 2/2023 | Chan | G06Q 10/0633 |
| 2005/0228683 A1* | 10/2005 | Saylor | G06Q 10/10 |
| | | | 705/1.1 |
| 2005/0288956 A1* | 12/2005 | Speicher | G06Q 10/10 |
| | | | 715/764 |
| 2006/0005140 A1* | 1/2006 | Crew | G06Q 10/06 |
| | | | 715/760 |
| 2008/0313281 A1* | 12/2008 | Scheidl | G06Q 10/06 |
| | | | 709/205 |
| 2010/0123930 A1* | 5/2010 | Tomizawa | G06F 3/1203 |
| | | | 358/1.15 |
| 2012/0005659 A1* | 1/2012 | Bonanno | G06F 11/362 |
| | | | 717/129 |
| 2014/0165043 A1* | 6/2014 | Pasala | G06F 11/3684 |
| | | | 717/124 |
| 2015/0286555 A1 | 10/2015 | Neravati | |
| 2020/0201689 A1* | 6/2020 | Laethem | G06F 9/451 |
| 2021/0042215 A1 | 2/2021 | Edwards et al. | |
| 2021/0141616 A1 | 5/2021 | Kane | |
| 2021/0263833 A1 | 8/2021 | Reisner et al. | |
| 2022/0164279 A1* | 5/2022 | Stocker | G06F 11/3664 |
| 2022/0179834 A1 | 6/2022 | Rachniowski et al. | |
| 2023/0236910 A1* | 7/2023 | Marinovici | G06F 40/205 |
| | | | 715/234 |
| 2024/0177092 A1* | 5/2024 | Kushwah | G06F 9/451 |
| 2024/0312559 A1* | 9/2024 | Woodley | G16B 40/00 |

FOREIGN PATENT DOCUMENTS

| | | | | |
|---|---|---|---|---|
| EP | 3901865 A1 * | 10/2021 | | G06F 11/3684 |
| WO | WO-2018050243 A1 * | 3/2018 | | G06F 9/48 |
| WO | 2021225881 A1 | 11/2021 | | |

OTHER PUBLICATIONS

Nicolas Kicillof, Wolfgang Grieskamp, Nikolai Tillmann, Victor Braberman, Achieving both model and code coverage with automated gray-box testing, A-MOST '07: Proceedings of the 3rd international workshop on Advances in model-based testing, Jul. 2007.

* cited by examiner

TEST COVERAGE FOR WORKFLOWS

BACKGROUND

A workflow can include one or more activities that are used to accomplish a given task. It can be difficult to test workflows when they are being developed. This can be particularly problematic when a workflow includes multiple activities that may or may not be executed for a given input. Therefore, traditional test coverage techniques may not be sufficient when testing workflows.

SUMMARY

Examples provided herein are directed to managing test coverage for workflows.

According to one aspect, an example computer system for managing test coverage for a workflow can include: one or more processors; and non-transitory computer-readable storage media encoding instructions which, when executed by the one or more processors, causes the computer system to create: a workflow execution engine programmed to execute the workflow, including a plurality activities, using a test case; an activity identification engine programmed to identify each time one of the plurality of activities is invoked by the workflow using the test case; and a test coverage engine programmed to determine the test coverage for the workflow based upon identification by the activity identification engine of the plurality of activities invoked by the workflow.

According to another aspect, an example method for managing test coverage for a workflow can include: executing the workflow, including a plurality activities, using a test case; identifying each time one of the plurality of activities is invoked by the workflow using the test case; and determining the test coverage for the workflow based upon identification of the plurality of activities invoked by the workflow.

The details of one or more techniques are set forth in the accompanying drawings and the description below. Other features, objects, and advantages of these techniques will be apparent from the description, drawings, and claims.

DETAILED DESCRIPTION

This disclosure relates to managing test coverage for workflows.

In the examples provided herein, a methodology is provided to measure and analyze the percentage of a workflow that is tested during a given testing period. By capturing detailed level activities during the test period, captured activity identifiers can be matched with identifiers in the workflow. This can be used to determine various aspects of test coverage, such as one or more of: (i) the number of test executions conducted during a specified time period; (ii) the overall percentage of activities within the workflow that were tested; (iii) specific activities, by name and unique identifier, that were or were not tested, indicating a lack of test coverage; and/or frequency at which an activity was tested; and (iv) identify potential redundant testing.

This example methodology can provide an understanding of the degree to which a workflow has been tested prior to implementation. This can reduce the risk of issues in production due to untested activities. This can also be used to optimize test cases to avoid missed activities and redundant testing. Finally, it can be used to confirm that new or changed portions of a workflow were tested and provide documented test evidence.

There are various technological advantages that can be associated with the functionality described herein. For example, the disclosed methodology can assure that test coverage is adequate for a given workflow, thereby increasing the robustness of the workflow. Further, the test coverage itself can be optimized, thereby increasing efficiencies while minimizing the resources needed for testing. Various other advantages are possible.

Figure 1:
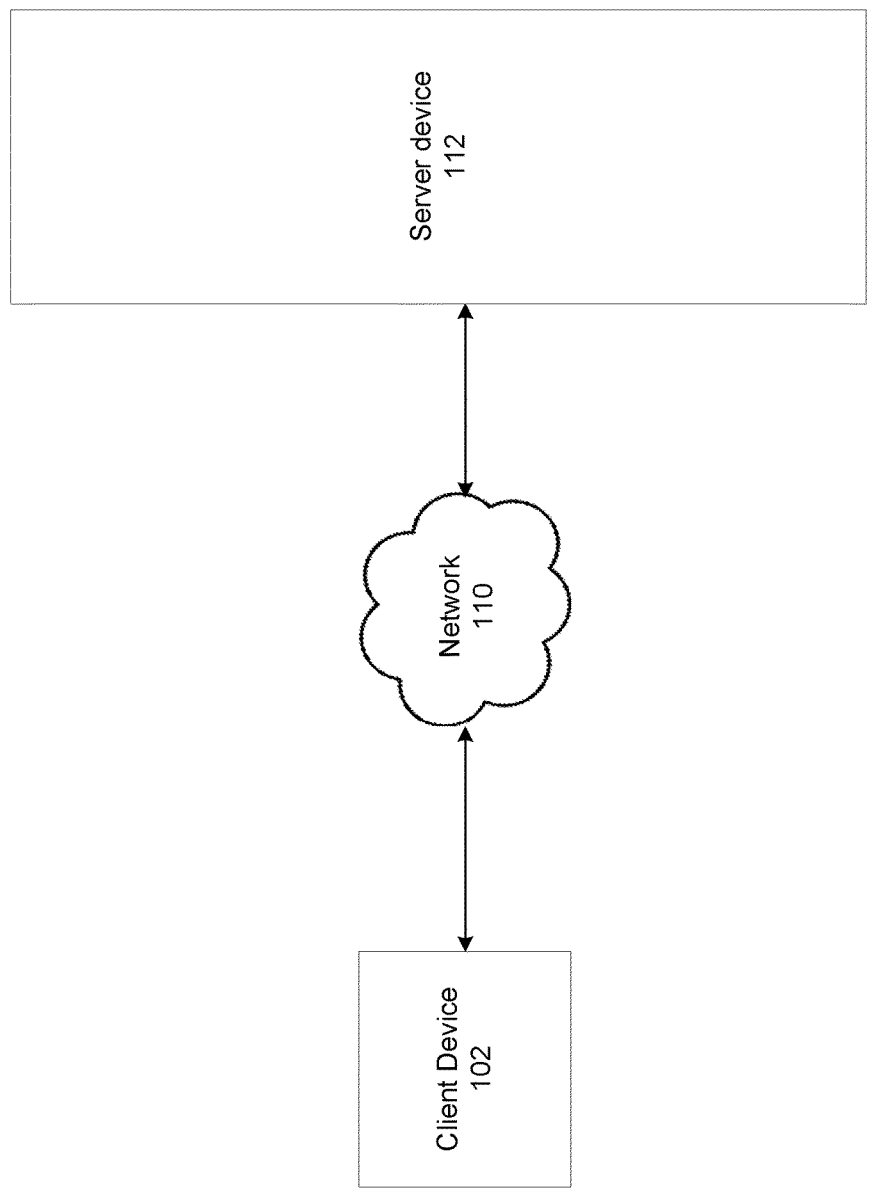
FIG. 1 shows an example system for managing test coverage for workflows.

FIG. 1 schematically shows aspects of one example system 100 programmed to manage test coverage for workflows. In this example, the system 100 can be a computing environment that includes a plurality of client and server devices. In this instance, the system 100 includes a client device 102 and a server device 112. The client device 102 can communicate with the server device 112 through a network 110 to accomplish the functionality described herein.

Each of the client and server devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The client device 102 can be programmed to communicate with the server device 112 to implement one or more workflows associated with the financial institution. For instance, the client device 102 can initiate a workflow relating to financial services for the financial institution, such as the underwriting of a loan. The server device 112 is programmed to initiate one or more activities associated with the workflow to perform the underwriting.

In the present example, the server device 112 is programmed to test the workflow used for the underwriting. For instance, the client device 102 can be programmed to initiate testing by controlling the server device 112 to use one or more test cases to test the workflow prior to the workflow being used in production. This testing can include running the workflow using the test cases and determining if the output from the workflow is an expected value or set of values.

In addition to running the workflow, the server device 112 is programmed to determine the test coverage associated with the test cases. As described further below, the determination of the test coverage can include one or more of: (i) the number of test executions conducted during a specified time period; (ii) the overall percentage of activities within the workflow that were tested; (iii) specific activities, by name and unique identifier, that were or were not tested, indicating a lack of test coverage; and/or frequency at which an activity was tested; and (iv) identify potential redundant testing.

The network 110 provides a wired and/or wireless connection between the client device 102 and the server device 112. In some examples, the network 110 can be a local area network, a wide area network, the Internet, or a mixture thereof. Many different communication protocols can be used. Although only two devices are shown, the system 100 can accommodate hundreds, thousands, or more of computing devices.

Figure 2:
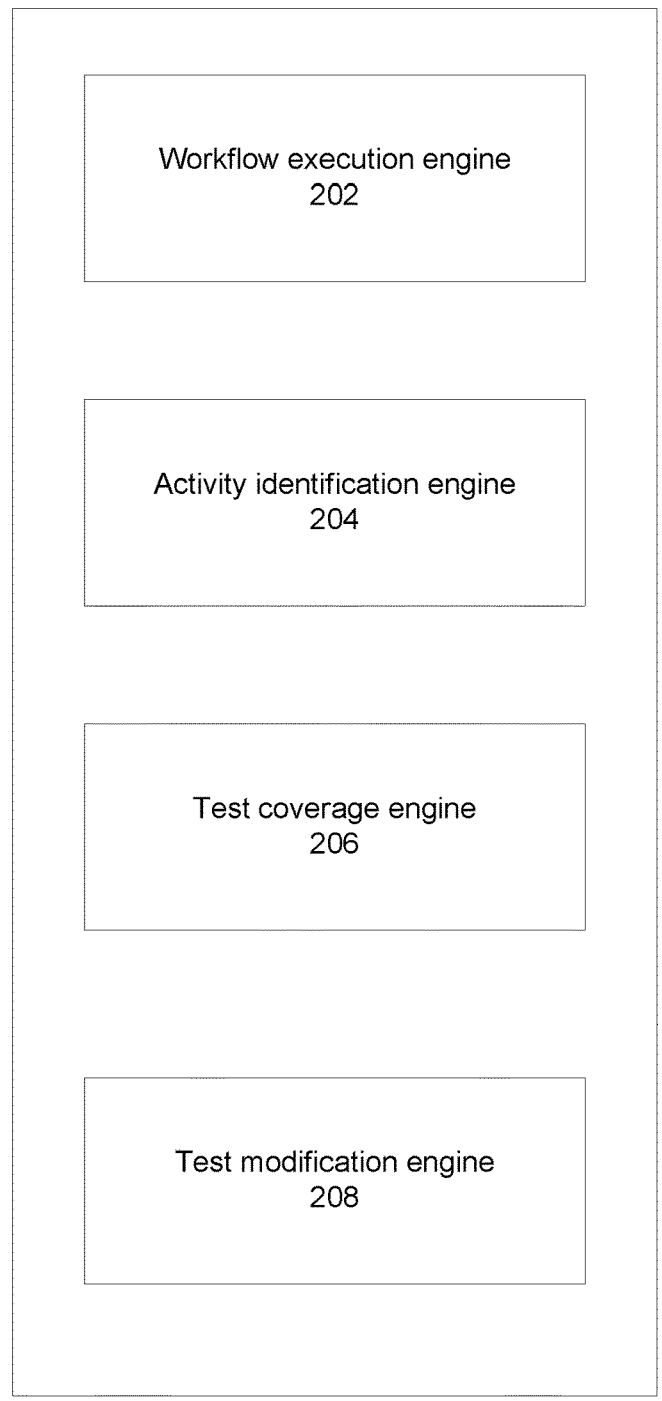
FIG. 2 shows example logical components of a server device of the system of FIG. 1.

Referring now to FIG. 2, additional details of the server device 112 are shown. In this example, the server device 112 has various logical modules that assist in managing test coverage for workflows. The server device 112 can, in this instance, include a workflow execution engine 202, an activity identification engine 204, a test coverage engine 206, and a test modification engine 208.

The workflow execution engine 202 is programmed to execute a specified workflow. For instance, the client device 102 can initiate the execution of a workflow by the server device 112. This can be done, for instance, in a test environment that allows the workflow to be initiated using one or more test cases. The test cases can be provided by the client device 102 and/or be defined by the server device 112.

In some examples, each instantiation of the workflow can be identified using a unique identifier, such as a Global Unique Identifier (GUID). This will allow for the various functionality below, including the ability to determine how often activities are executed for each time a workflow is run.

Following the example above, the workflow can be an underwriting process for a loan. The client device 102 can initiate the execution of the workflow by the workflow execution engine 202 of the server device 112 using one or more test cases, such as test cases that provide specific examples of data associated with loans undergoing the underwriting process.

The workflow execution engine 202 can execute the various activities associated with the workflow using the test cases. These activities can be discrete processes for the workflow, such as models that are used by the workflow to achieve the desired result. For example, in the underwriting workflow, one activity may be to compare a creditworthiness of a borrower to the specifics of the loan (e.g., loan amount, duration, etc.). Another example activity of the underwriting process may be to compare a value of a property associated with the loan to the loan amount.

Figure 3:
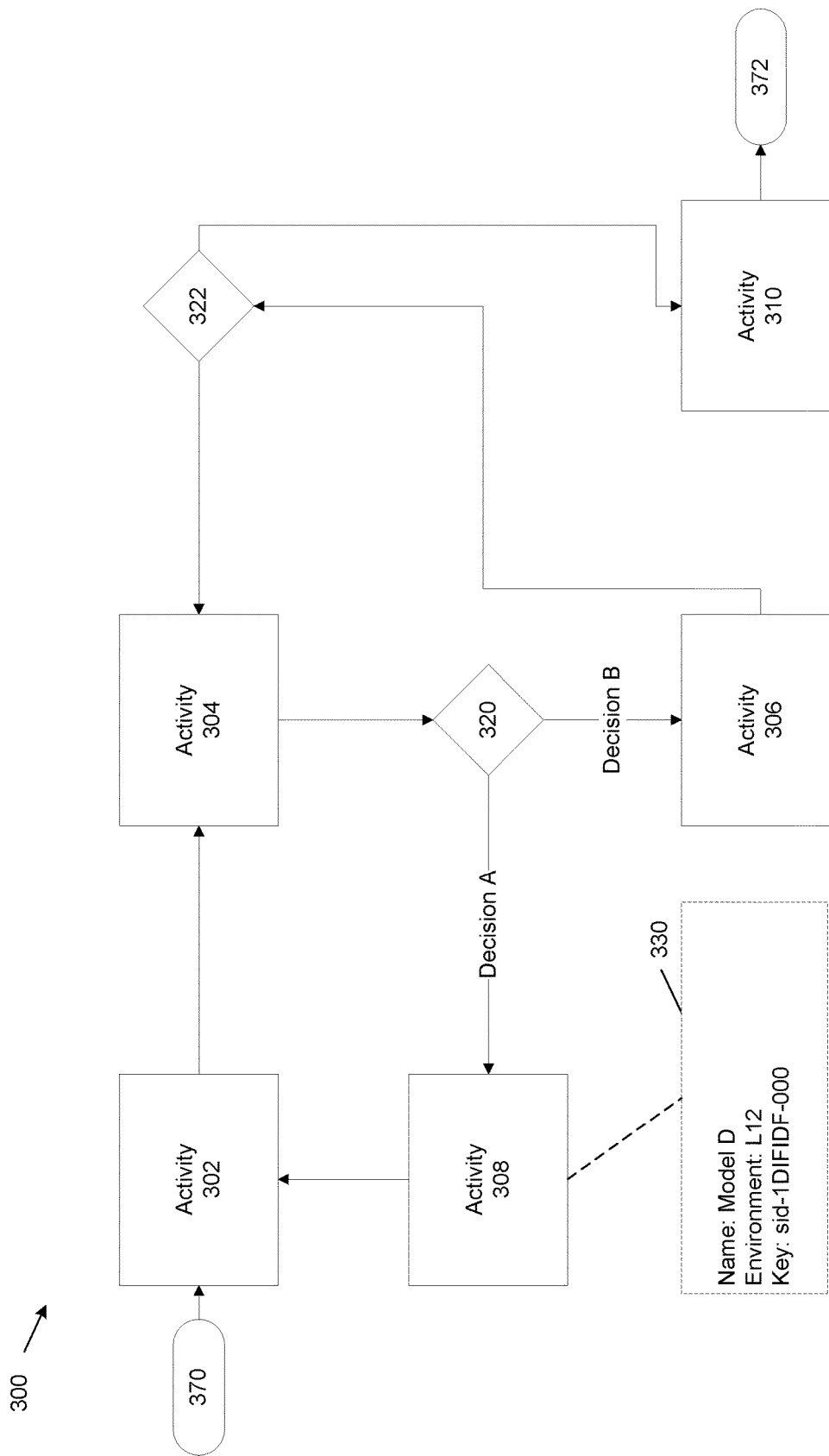
FIG. 3 shows an example workflow executed by the server device of FIG. 2.

One non-limiting example of such a workflow 300 is depicted in FIG. 3. In this example, the workflow 300 includes activities 302, 304, 306, 308, 310 that together makeup the workflow 300 when executed by the server device 112. The workflow 300 also includes decision blocks 320, 322 that dictate what activities are executed based upon the decisions made at these blocks. The workflow 300 generally starts at block 370 and ends at block 372. The workflow follows a path from the block 370, through the activities and decision blocks, and to the block 372 at the end. The test case or cases used to initiate the workflow 300 dictates the path taken and the activities invoked.

Referring back to FIG. 2, the activity identification engine 204 is programmed to identify which activities are invoked while the workflow 300 is executed using the test cases. For instance, the activity identification engine 204 can be programmed to identify each time a particular activity is executed for the workflow 300. This identifier is used by the activity identification engine 204 to match each invocation of an activity to the specific activity of the activities of the workflow 300. The activity identification engine 204 can also capture other metadata associated with the activity, such as the data that is inputted and outputted by the activity during each execution.

For example, referring again to FIG. 3, information that can be captured by the activity identification engine 204 for the activity 308 during execution of the workflow 300 is shown. In this example, the activity identification engine 204 is programmed to capture a unique identifier each time the activity 308 is executed by the workflow 300 during a test case. This unique identifier can be a GUID or similar identifier that uniquely identifies the activity 308 from the other activities of the workflow 300.

In this example, the activity 308 includes various information that is captured by the activity identification engine 204, including the name of the activity (e.g., "Model D"), an environment for the activity (e.g., "L12"), and a key for the activity (e.g., "sid-1DIFIDF-000"). The key can be the GUID that uniquely identifies the activity 308. The activity identification engine 204 can be programmed to identify each time the activity 308 is executed by the workflow 300 based upon the GUID that is reported by the workflow 300 to the activity identification engine 204.

For instance, each time the workflow 300 receives a "Decision A" at the decision block 320, the activity 308 is executed. Upon each execution, the activity identification engine 204 captures the GUID associated with the activity 308 to identify its execution. The activity identification engine 204 can be programmed to capture each GUID that is reported as the workflow 300 is executed for a given test case. This information can be used, as described further below, to manage the test coverage for the workflow 300.

Referring back to FIG. 2, the test coverage engine 206 is programmed to determine an amount of the workflow 300 that has been tested by a given test case or set of test cases. This can be accomplished by the test coverage engine 206 using the information from the activity identification engine 204 to determine how many of the activities of the workflow 300 have been executed using the test case(s).

For instance, the test coverage engine 206 can determine a number of executions that were conducted given the test case(s). For example, for a given test case, the test coverage engine 206 can use the information from the activity identification engine 204 to determine the number of activities that were executed by the workflow 300. This can be done by examining the GUIDs from the activities executed by the workflow 300. For instance, each time the test coverage engine 206 identifies the GUID "sid-1DIFIDF-000", the test coverage engine 206 knows the activity 308 has been executed by the workflow 300. The test coverage engine 206 can use the GUIDs from the activities to determine how many activities and how many times each activity is executed by the workflow 300 for a test case.

In some instances, the number of executions for a given period of time are measured by the test coverage engine 206. For instance, the test coverage engine 206 can be programmed to determine what activities are executed by the workflow 300 for a given test case for a first time period, a second time period after the first time period, and a third time period after the second time period. This can be used to determine aspects, such as regression testing. For instance, when the test coverage engine 206 determines that the activity 308 has been executed many times during a given period of time for the workflow 300, the test coverage engine 206 can flag this as redundant testing. Many other configurations are possible.

The test coverage engine 206 can also be programmed to use the information from the activity identification engine 204 to determine an overall percentage of activities within the workflow 300 that were tested. For example, assume for a given test case that the workflow 300 executes activity 302 and activity 304. Then the workflow 300 then selects "Decision B" at decision block 320 and executes activity 306 and activity 310 before ending at block 372. In such a scenario, the activity 308 would have not been tested using this test case, resulting in a test coverage of 80 percent for the workflow 300 given the test case.

In addition to percentages, the test coverage engine 206 can provide indications for the number of invocations for particular activities of each workflow and/or the frequency at which each or some of the activities are invoked. An example of such an analysis is provided in the table below.

| Activity | Frequency of executions | Percentage of total executions |
| --- | --- | --- |
| Activity 302 | Workflow 1: 1<br>Workflow 2: 1 | 29 percent |
| Activity 304 | Workflow 1: 2<br>Workflow 2: 0 | 29 percent |
| Activity 306 | Workflow 1: 1<br>Workflow 2: 0 | 14 percent |
| Activity 308 | Workflow 1: 1<br>Workflow 2: 0 | 14 percent |
| Activity 310 | Workflow 1: 1<br>Workflow 2: 0 | 14 percent |

Another example of a report by the test coverage engine 206 follows. In this example report, the activity coverage for an execution of a workflow is shown.

| Execution(s) | Activities Tested | Activities not Tested | Coverage |
| --- | --- | --- | --- |
| Workflow 1:1 | Activity 302<br>Activity 304<br>Activity 310 | Activity 306<br>Activity 308 | 40% |
| Workflow 2:1 | Activity 302<br>Activity 304<br>Activity 306<br>Activity 308<br>Activity 310 | N/A | 100% |

Many other configurations and metrics can be reported by the test coverage engine 206.

In another example, the test coverage engine 206 can also be programmed to create a coverage map that visually depicts the activities that were tested by a test case for the workflow 300. For instance, the coverage map can visually indicate which activities were tested and which activities were not tested. Further, the map can be coded (e.g., with color or other indicators) to indicate aspects such as redundant testing or a lack of testing of certain activities.

In another example, the test coverage engine 206 can be programmed to measure the results of testing over a period of time, such as hours, days, or weeks. The test coverage engine 206 can indicate the test coverage for the workflow 300 over that time period. By monitoring the test coverage over the time period, the test coverage engine 206 can indicate possible gaps in testing and/or redundant testing. The information can also be used to conduct regression testing.

Finally, the test modification engine 208 is programmed to make changes to the test cases that are used to test the workflow 300 to optimize the test coverage. For example, in the scenario in which the test coverage engine 206 determines that the activity 308 is not tested for a given test case, the test coverage engine 206 can modify the test case to include information that will invoke the activity 308 when the workflow 300 is executed. In another scenario where the test coverage engine 206 determines that there is redundant testing, the test modification engine 208 can be programmed to change one or more of the test cases to minimize the coverage of the activities associated with the redundant testing.

Figure 4:
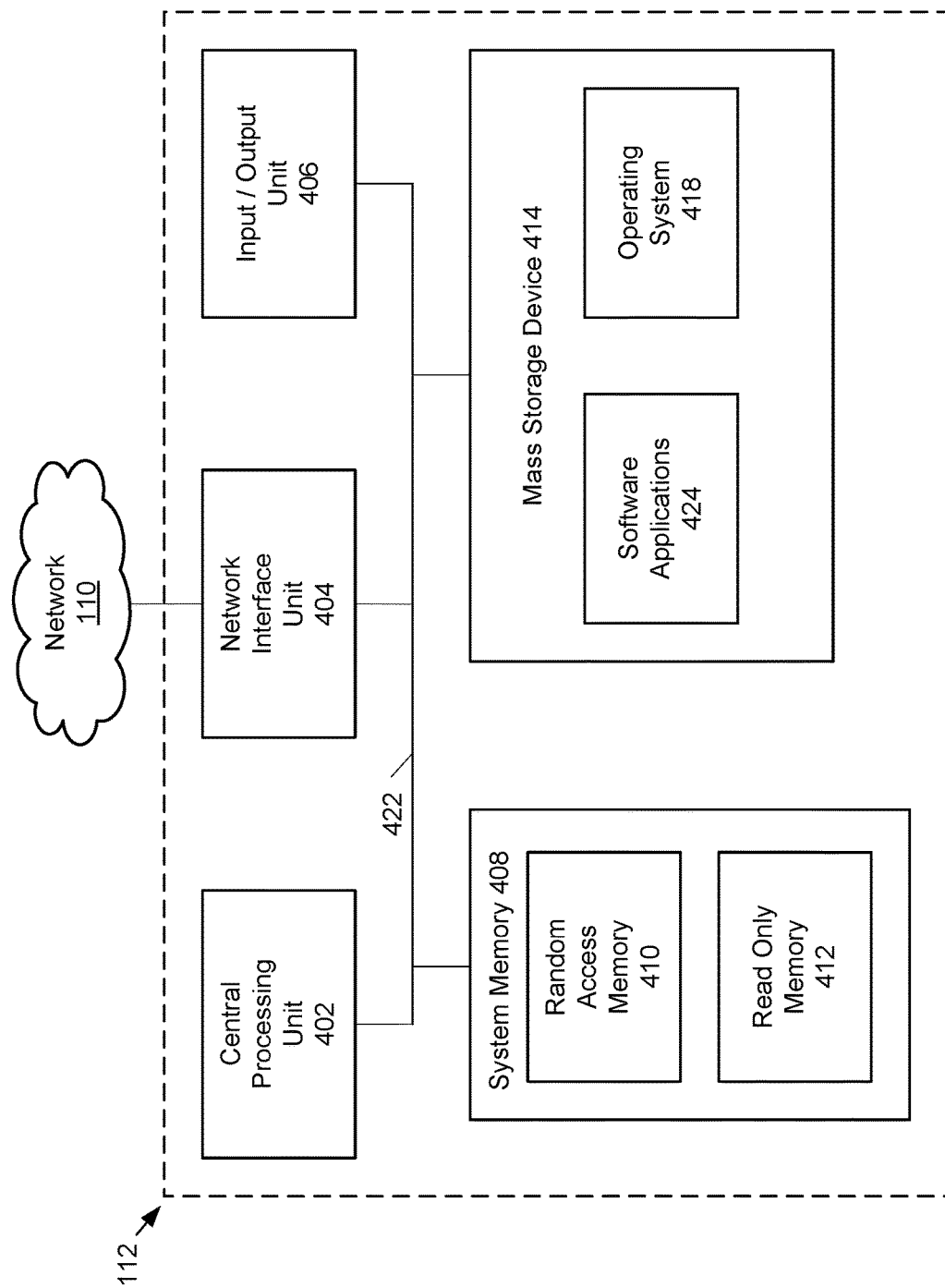
FIG. 4 shows example physical components of the server device of FIG. 2.

As illustrated in the embodiment of FIG. 4, the example server device 112, which provides the functionality described herein, can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for managing test coverage for a workflow, comprising:
   one or more processors; and
   non-transitory computer-readable storage media encoding instructions which, when executed by the one or more processors, causes the computer system to create:
      a workflow execution engine programmed to execute the workflow, including a plurality of activities, using a test case;
      an activity identification engine programmed to identify each time one of the plurality of activities is invoked by the workflow using the test case by capturing a global unique identifier associated with each invocation; and
      a test coverage engine programmed to:
         determine the test coverage for the workflow based upon identification by the activity identification engine of the plurality of activities invoked by the workflow using the global unique identifier associated with each invocation;
         determine a frequency of invocation of each of the plurality of activities over a specified time period; and
         identify redundant testing of activities based upon the frequency of invocation of the plurality of activities over the specified time period as compared to other time periods.

2. The computer system of claim 1, comprising further instructions which, when executed by the one or more processors, causes the computer system to execute the workflow using multiple test cases.

3. The computer system of claim 1, wherein the test coverage is a percentage of the plurality of activities that are invoked for the test case.

4. The computer system of claim 1, comprising further instructions which, when executed by the one or more processors, causes the computer system to create a test modification engine programmed to modify the test case to optimize the test coverage.

5. The computer system of claim 4, wherein the test case is modified by the test modification engine to: invoke a greater number of the plurality of activities; or reduce redundancy of invocation of the plurality of activities.

6. A method for managing test coverage for a workflow, comprising:
   executing the workflow, including a plurality of activities, using a test case;
   identifying each time one of the plurality of activities is invoked by the workflow using the test case by capturing a global unique identifier associated with each invocation;
   determining the test coverage for the workflow based upon identification of the plurality of activities invoked by the workflow using the global unique identifier associated with each invocation;
   determining a frequency of invocation of each of the plurality of activities over a specified time period; and
   identifying redundant testing of activities based upon the frequency of invocation of the plurality of activities over the specified time period as compared to other time periods.

7. The method of claim 6, further comprising executing the workflow using multiple test cases.

8. The method of claim 6, wherein the test coverage is a percentage of the plurality of activities that are invoked for the test case.

9. The method of claim 6, further comprising creating a test modification engine programmed to modify the test case to optimize the test coverage.

10. The method of claim 9, wherein the test case is modified by the test modification engine to: invoke a greater number of the plurality of activities; or reduce redundancy of invocation of the plurality of activities.

* * * * *